(12) United States Patent
Sondur et al.

(10) Patent No.: US 6,457,048 B2
(45) Date of Patent: Sep. 24, 2002

(54) SYSTEM FOR REPRESENTING DEVICE TOPOLOGY IN A COMPUTER NETWORK OPERABLE INDEPENDENT OF NETWORK MANAGEMENT SOFTWARE

(75) Inventors: Raghavendra Sondur, Santa Clara, CA (US); Akhil Arora, Fremont, CA (US); Rajeev Angal, Santa Clara, CA (US); Balaji Pagadala, Sunnyvale, CA (US); Bart Fisher, Sunnyvale, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/801,547

(22) Filed: Mar. 7, 2001

Related U.S. Application Data

(62) Division of application No. 09/205,826, filed on Dec. 4, 1998, now Pat. No. 6,243,746.

(51) Int. Cl.$^7$ .................. G06F 15/177; G06F 15/173
(52) U.S. Cl. .................. 709/220; 709/221; 709/224
(58) Field of Search ................ 709/220, 221, 709/224

(56) References Cited

U.S. PATENT DOCUMENTS

| | | | | |
|---|---|---|---|---|
| 5,049,873 A | * | 9/1991 | Robins et al. | 340/825.01 |
| 5,185,860 A | * | 2/1993 | Wu | 709/224 |
| 5,297,138 A | * | 3/1994 | Black | 370/254 |
| 5,737,319 A | * | 4/1998 | Croslin et al. | 370/254 |
| 5,845,081 A | * | 12/1998 | Rangarajan et al. | 370/258 |
| 5,848,243 A | * | 12/1998 | Kulkarni et al. | 709/224 |
| 5,948,055 A | * | 9/1999 | Pulsipher et al. | 709/202 |
| 6,003,074 A | * | 12/1999 | Vasconcellos | 370/254 |
| 6,041,347 A | * | 3/2000 | Harsham et al. | 709/220 |
| 6,170,009 B1 | * | 1/2001 | Mandal et al. | 709/223 |

* cited by examiner

Primary Examiner—Krisna Lim
(74) Attorney, Agent, or Firm—Beyer Weaver & Thomas LLP

(57) ABSTRACT

Software, methods, and systems for representing devices on a computer network are described. In one embodiment, the system of the invention includes a topology service. The topology service includes a protocol interface mechanism, an engine, and a database support mechanism. The topology service is coupled with a data storage mechanism. In a more specific embodiment, the protocol interface mechanism, engine, and database support mechanism each configured to operate as independent components.

8 Claims, 12 Drawing Sheets

SYSTEM FOR REPRESENTING DEVICE TOPOLOGY IN A COMPUTER NETWORK OPERABLE INDEPENDENT OF NETWORK MANAGEMENT SOFTWARE

This application is a division of application Ser. No. 09/205,826, filed Dec. 4, 1998, now U.S. Pat. No. 6,243,746.

BACKGROUND OF THE INVENTION

1. Field of the Invention

The present invention relates to computer network architectures, and, more specifically, to software for managing computer and communications networks. More particularly, the present invention provides software, systems, and apparatus for managing software entities and hardware over a computer network. The present invention has applications in the areas of computer science, computer network management, and computer software.

2. The Related Art

The demands on computer network managers have grown exponentially as the size and extensiveness of computer networks has grown over the past decade. Starting from the relatively simple task of maintaining communication among a relatively small number of mainframe computers, network managers must now coordinate operations among thousands of computers, printers, servers, and other networked devices. With the advent of the Java® and Jini™ programming languages, even household devices will soon become linked over computer networks running on household "intranets" that in turn are linked to the worldwide Internet. Thus, there appears to be no end in sight to the increasing burden on network managers.

To control and coordinate the software associated with the myriad of networked computers and other devices, network managers employ software designed to track, establish communications with, and control various software entities or processes that exist independently or represent the networked devices. Entities that represent networked devices are also referred to herein as "agents". The software used by the network manager interacts with various "platform-level" software services to enable the network manager to locate and interact with the various entities running on the network. Various services are provided to identify the entities, retrieve needed data about the properties and states of the entities, and store that information for use by other entities and user applications. In particular, a topology service is used to provide a logical representation of the devices on the network. The representations can be acted upon by the applications.

The number of entities being processed by the network management software can be great for large computer networks. Managing such a large number of entities can slow system performance dramatically. Also, many systems rely on the same central software service to process both communications connection and manage entity data. This reliance on a single service to process such diverse yet vital tasks creates a risk of catastrophic network failure if the central software service fails. Such risks and decreased performance are not acceptable for large-scale networks that must be available twenty-four hours a day, seven days a week.

Therefore, it would be beneficial to provide a topology service for a computer network management architecture that can process large numbers of devices and that continues to operate even if a central piece of the network management software fails. The present invention meets these and other needs.

SUMMARY OF THE INVENTION

The present invention meets the above-described needs by providing, in one aspect, a computer network entity topology system for computer and communications network management architectures that has high processing capacity and is robust. The design of the topology software, system, and methods provided by the present invention can be scaled readily to handle efficiently the demands of ever-growing computer and communications networks and can be run in processes separate from other network management functions. Such a capability reduces the risk of a catastrophic network management failure.

In a first aspect, the present invention provides a system for representing devices on a computer network. In one embodiment, the system of the invention includes a topology service. The topology service includes a protocol interface mechanism, an engine, and a database support mechanism. The topology service is coupled with a data storage mechanism. In a more specific embodiment, the protocol interface mechanism, engine, and database support mechanism each configured to operate as independent components. The configuration is arranged such that either the protocol mechanism, the engine, or the database support mechanism components can be substituted with a second such component without substantial reconfiguration of the remaining components. In another embodiment, the engine includes a series of objects that define computer network topology nodes. The nodes include information about the devices on the network.

In another aspect, the present invention includes a method for representing devices on a computer network. In one embodiment, the method of the invention devices on a computer network are identified. A topology object is created to represent the device. The object is associated with the device. The associated object is stored in a database managed by a topology service, such as just described. In another embodiment, the method provided by the invention includes receiving an alarm notification regarding a device having an associated topology object stored in the database. The topology object is extracted from the database and acted on by the topology object in accordance with the alarm. The step of acting includes, according to another embodiment of the invention, the sub-steps of updating an alarm count in the topology object, propagating a notice to other topology nodes associated with the topology object, storing information related to the alarm and the database, and notifying other services on the computer network.

In yet another aspect, the present invention provides computer-readable media and data signals that are configured to cause a computer to implement the computer-controlled steps of providing a topology service on a computer network. The topology service is configured to create and manage topology objects representing devices on the network. The computer is further controlled by the media and signals to create topology objects representing devices and associating the objects with the devices. Furthermore, the computer is further controlled by the media and signals to store the associated topology objects in a database managed by the topology service.

These and other aspects and advantages will become apparent when the Description below is read in conjunction with the accompanying Drawings.

DESCRIPTION OF SOME EMBODIMENTS OF THE INVENTION

The present invention provides an computer network topology service that handles devices and other entities installed on a computer or communications network. The topology service provided by the present invention is capable of handling large number of devices and entities and can be installed and operated separately from other network management software components to provide thereby more robust operations in the case one or more such components fails. The topology service provided by the present invention can be scaled readily to handle greater volumes of network traffic.

Figure 1:
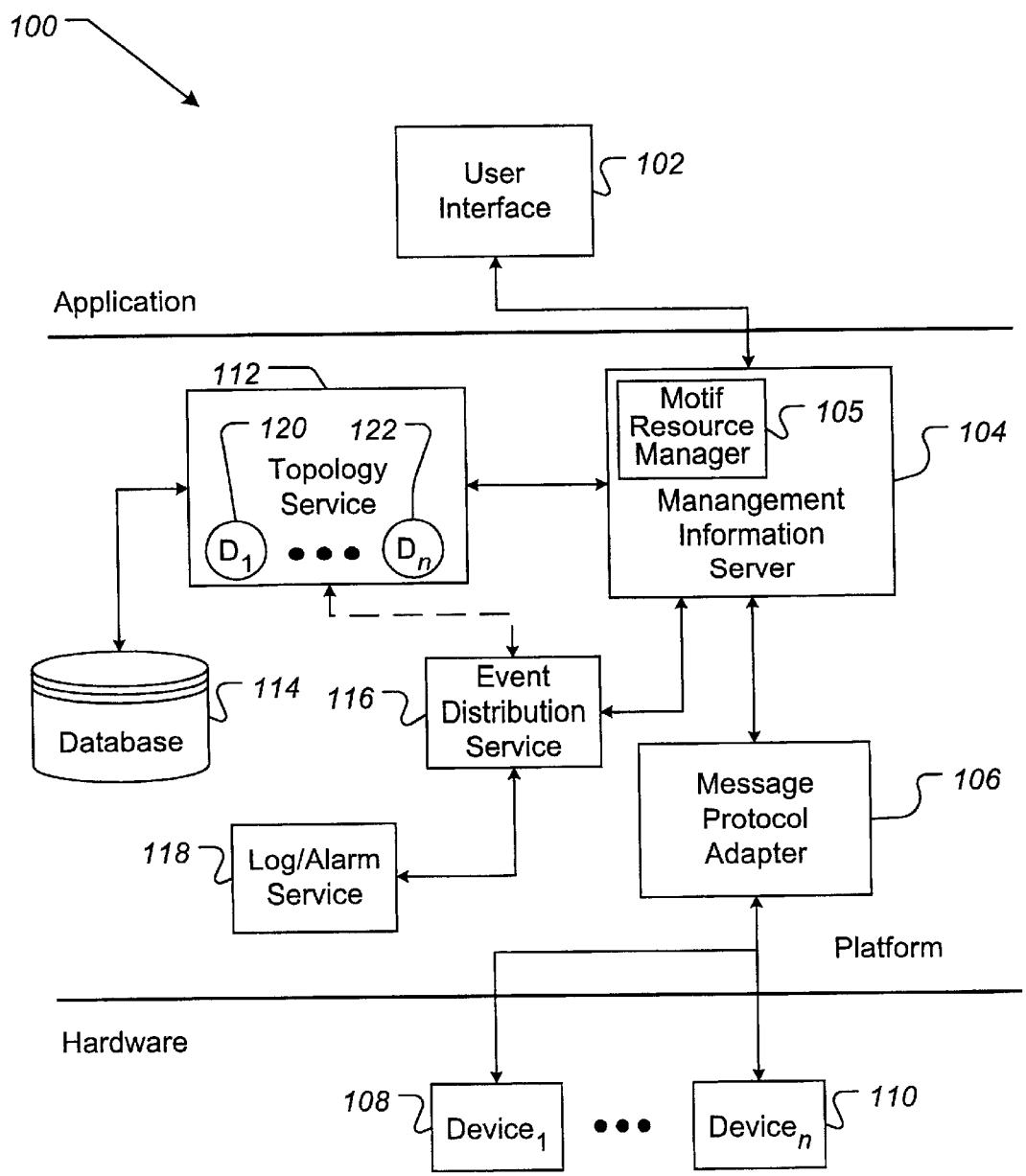
FIG. 1 is an illustration of certain software and hardware elements in a computer network in accordance with the present invention.

FIG. 1 at 100 illustrates various software and hardware components used to manage computer network operations in accordance with one embodiment of the present invention. Generally, computer network software and hardware operations can be organized conceptually into three layers: an Application layer, a Platform layer, and a Hardware layer. The Application layer generally comprises user interface ("UI") software 102 designed to allow network operators to communicate with software and hardware installed on the network. Such communications include, but are not limited to, sending requests, receiving alarms, receiving status reports, locating devices, and controlling devices. A Hardware layer represent the various devices installed on the network, such as devices 108 ("Device$_1$") through 110 ("Device$_n$"). Examples of devices include communications devices, routers, severs, modems, computers, printers, network interface cards, and hubs. Still more examples of applications and devices will be apparent to those having skill in the computer science and computer network arts. In particular, the software, systems, and methods described herein can be applied to communications networks by analogy to the presentation provided for communications networks embodiments of the present invention. Such adaptation can be made by those of skill in the computer science, network, and communications arts where needed.

Between the Application and Hardware layers is the Platform layer. This layer comprises network management software designed to allow the network administrator operating an application such as UI 102 access to entities and devices on the network. The network management software also operates to enable communications among various entities installed on the network, including event communications. In one embodiment, the network communications are handled by a central Management Information Server ("MIS") 104 that coordinates messages sent between entities running on each of the network layers. MIS 104 interacts with various services for network management services in addition to its own services. In particular, MIS 104 interacts with a Topology Service 112 (described in greater detail below) that in turn is coupled with a Database 114 (also described in greater detail below), an Event Distribution Service ("EDS") 116 that processes event signals and propagates those signals to various "listener" entities on the network, and a Logging/Alarm Service 118. The latter two services provide resources for managing network entities, events generated by the entities, and alarms. Examples of EDS 116 and services can be found in co-pending U.S. patent applications Ser. Nos. 09/205,072 (now issued as U.S. Pat. No. 6,298,378) and 09/206,095 each of which is incorporated herein by reference for all purposes. The platform level entities further include a Message Protocol Adapter ("MPA") 106 that allows communication between devices 108–110 and MIS 104. One example of an MPA can be found in co-pending U.S. patent applications Ser. Nos. 09/205,078 and 09/205,325.

Topology Service 112 also communicates through MIS 104 and, optionally, with EDS 116. The Topology Service provides resources for managing information about, including the location, identity, and state of the entities on the network. In one embodiment, Topology Service 112 includes management objects 120–122 that correspond to the entities and devices on the network. Alternatively, these objects can be located elsewhere. In a more particular embodiment, management objects 120–122 include GDMO-defined objects that represent the devices on the network. However, the invention can include management objects having any suitable definition. In another embodiment, Topology Service 112 is a process separate from MIS 104. In still another embodiment, Topology Service 112 runs on a separate processor to reduce computational overhead on the processor running MIS 104. Those having skill in the computer science and network arts will appreciate that such an embodiment includes the advantages of greater speed since the processing chores of the Topology Service and MIS are divided between two processors. In addition, using a second processor to run Topology Service processes reduces the chance that both the Topology Service and MIS will fail simultaneously. In still another embodiment, Topology Service 112 functions within the same process as MIS 104.

Figure 2:
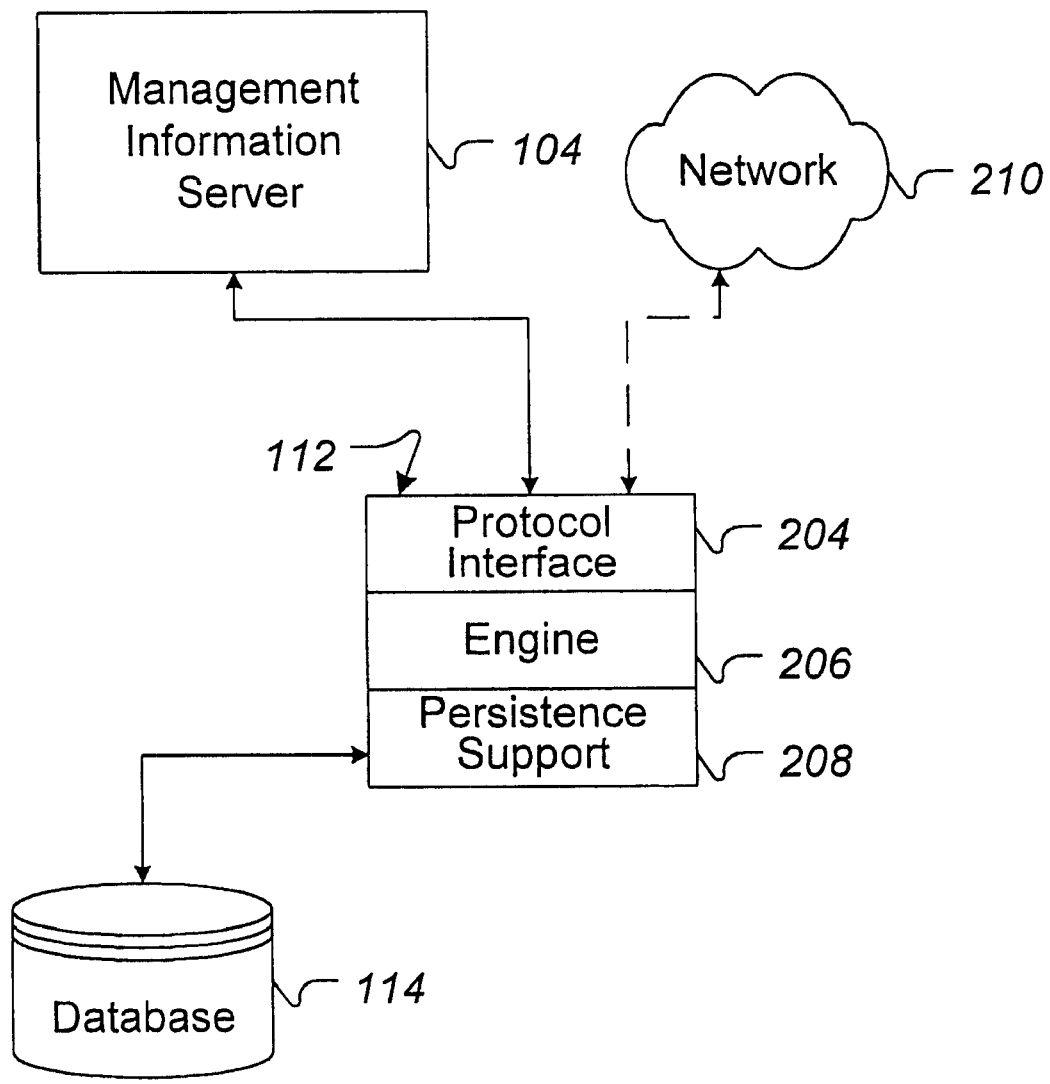
FIG. 2 is a schematic illustration of Topology Service 112 in greater detail.

The architecture of Topology Service 112 is described in greater detail with respect to FIG. 2. In the illustrated embodiment, Topology Service 112 includes three elements: Protocol Interface 204, Engine 206, and Persistence Support 208. In one embodiment, each of these layers is modular, i.e., the layer can be removed from the others and replaced with another version or implementation without significant alternation of the remaining layers. For example, a CMIS-configured Protocol Interface can be substituted with a CORBA-configured Protocol Interface. Protocol Interface 204 provides communications support between Engine 206 and the other network components, especially MIS 104 and the network 210. In one embodiment, Protocol Interface 204 processes messages received from the MIS and sends responses back to the MIS. Such processing includes encoding and decoding, verification, access control (security), scoping, filtering and interfacing with Engine 206.

In one embodiment, Protocol Interface 204 processes messages using Common Management Information Services ("CMIS") protocol. In a more specific embodiment, Protocol Interface 204 includes the following classes: PendingRequest, RespElement, MsgFilter, CMISTopoContainer (including CMISTopoNode, CMISTopoNodeDB, CMISTopoTypeDB, CMISTopoType, CMISTopoViewDB, CMISTopoView, CMISTopoViewNode as described below), and AttrInfo. These classes are shown in greater detail in Table 1–Table 5.

The PendingRequest class handles the incoming requests to Topology Service 112. Such requests include verification, scoping, collecting linked responses, and delivering responses to the requestor. One embodiment of the implementation of the PendingRequest class is shown as a decomposition in Table 1. Of course, other equivalent implementations will be apparent to those having skill in the computer science and network arts.

TABLE 1

PendingRequest
MessageSAP *sap
ObjReqMess *orig_msg
Boolean is_error
MessType err_type
Boolean access_controlled
U32 cbs_pending
enum ReqStatus {STARTING, IN_SERVICE, WAITING, COMPLETED, CANCELLED}
ReqStatus status
static Result verify_request()
Result build_list()
Result start_req()
Result do_create_req()
void get_done(ObjResMess *)
void set_done(ObjResMess *)
void del_done(ObjResMess *)
void cr_done(ObjResMess *)
void action_done(ObjResMess *)
MessId get_msg_id()
const Asn1 Value &get_filter()
Callback req_complete
static RWTQueue<PendingRequest, RWTValSlist<PendingRequest>> q_pending_reqs
RWTQueue<RespElement, RWTValSlist<RespElement>> resp_q verify_request() verifies the incoming request for validity and access control. It also sets the access_controlled attribute of the object to indicate whether check_access returned "allow" or "unknown". If check_access returns "deny" a response is send back immediately without forming a new PendingRequest.

build_list() performs scoping. If an earlier call to check_access returned "Unknown", then check_access will be called at each of the sub-requests in the scope. Build_list() also increments the counter cbs_pending for each of the sub-requests formed in the scope.

start_req() services the queue of the PendingRequest. This can be done serially or in a multi-threaded fashion.

do_create_req() performs the create operation.

get_done(), set_done(), del_done(), cr_done(), action_done() are called at the end of performing an operation on a GDMO object. Each then decrements the counter cbs_ending and determines whether to send a response based upon the sync of the request.

get_msg_id(), get filter()are utility functions to get the values from the incoming message.

RespElement holds the node on which an operation was performed and the response itself. In one embodiment, if the sync in the message is BEST_EFFORT there will be only one instance of this class, but if the sync is ATOMIC there will be an instance for each of the responses in the scope of the PendingRequest. One example of RespElement is shown as a decomposition in Table 2. Of course, other equivalent implementations will be apparent to those having skill in the computer science and network arts.

TABLE 2

RespElement
Message *rmsg
Node *node

MsgFilter is used for performing filtering. In one embodiment, MsgFilter is used to perform CMIS filtering and is a subclass of the Protocol Management Interface ("PMI") filter class. In a more specific embodiment, MsgFilter overrides the need_type, need_value, end_filter methods of the base class. One example of MsgFilter is shown as a decomposition in Table 3

TABLE 3

MsgFilter
FilterResult filter_result
Result need_type(const Asn1 Value &)
Result need_value (const Asn1 Value &)
void end_filter(FilterResult)
FilterResult get_filter_result()

Get_filter_result() returns the result of the filtering operation, MATCH or NO_MATCH. Of course, other equivalent implementations will be apparent to those having skill in the computer science and network arts.

CMISTopoContainer is an abstract class, which has virtual methods to perform CMIS operations on GDMO-defined topology objects. There is a subclass defined corresponding to each of the GDMO objects for the topology. In one embodiment, include the subclasses CMISTopoNode, CMISTopoNodeDB, CMISTopoTypeDB, CMISTopoType, CMISTopoViewDB, CMISTopoView, CMISTopoViewNode. An example of CMISTopoContainer is shown as a decomposition in Table 4, other equivalent implementations will be apparent to those having skill in the computer science and network arts.

TABLE 4

CMISTopoContainer
PendingRequest *ptr_pend_req
Asn1Value oi
Asn1Value oc
Asn1Value pkgs
Asn1Value nb
Asn1Value cr_attr_list
Asn1Value action_reply
Asn1Value attr_resp_list
ObjResMess *resp_msg
virtual Result start_get_req(PendingRequest *, const Asn1Value &getlist) = 0
virtual Result start_set_req(PendingRequest *, const Asn1Value &setlist) = 0

TABLE 4-continued

```
virtual Result start_cr_req(PendingRequest *,
const Asn1Value &crlist) = 0
virtual Result start_del_req(PendingRequest *,
const Asn1Value &dellist) = 0
virtual Result start_action_req(PendingRequest *,
const Asn1Value &actiontype,
const Asn1Value &actioninfo) = 0
virtual Result start_event_reg(EventReg *) = 0
``` ptr_pend_req is a pointer to the object that forwarded the pending request.

oi, oc, pkgs, nb represent some attributes for the GDMO object.

start_get_req(), start_set_req(), start_cr_req(), start_del_req(), start_action_req() are member functions that instantiate the appropriate Node object from the behavior layer, perform filtering, the corresponding CMIS operation, and the response.

An example of the CMISTopoNode subclass is shown as a decomposition in Table 5 below. The other subclasses (CMISTopoNodeDB, CMISTopoTypeDB, CMISTopoType, CMISTopoViewDB, CMISTopoView, CMISTopoViewNode) can be constructed by analogy. Other equivalent implementations will be apparent to those having skill in the computer science and network arts.

TABLE 5

```
CMISTopoNode
static RWTPtrHashMap<Oid, AttrInfo,
hash_oid, cmp_oid>hash_for_attr_info
Result start_get_req(PendingRequest *,
const Asn1Value &getlist)
Result start_set_req(PendingRequest *,
const Asn1Value &setlist)
Result start_cr_req(PendingRequest *,
const Asn1Value &crlist)
Result start_del_req(PendingRequest *,
const Asn1Value &dellist)
Result start_action_req(PendingRequest *,
const Asn1Value &actiontype,
const Asn1Value &actioninfo)
static RWTPtrHashMap<Oid, AttrInfo,
hash_oid, cmp_oid>hash_for_attr_info
static node_change_func(U32 id, U32 changes)
``` hash_for_attr_info maintains a hash for all the attributes belonging to this GDMO object. The element of the hash is an object of AttrInfo class described below.

node_change_func() is called whenever the transaction on the Node object is committed. This function forms an attribute value change notification, which needs to be issued along with the set response.

The above-mentioned AttrInfo class is used to store information about an attribute, like the Oid, value and other MDR related information such as filtering info. An example of the implementation of this class is shown as a decomposition in Table 6 below. Other equivalent implementations will be apparent to those having skill in the computer science and network arts.

TABLE 6

```
AttrInfo
Oid attr_oid
Asn1Value attr_asn
AttributeIndex ix
```

TABLE 6-continued

```
AttributeProps prop
FilterMatchRule match_rule
Asn1Value default_asn_value
const Asn1Value &get_asn_val()
const Asn1Value &get_default_asn_val()
AttributeIndex get_attr_index()
AttributeProps get_attr_props()
FilterMatchRule get_match_rule()
```

Engine 206 provides the services supported by Topology Service 112 (i.e., the "behavior" of the Topology Service). In one embodiment, Engine 206 provides the API for Protocol Layer 204, and implements a group of C++ classes to create and manage nodes on a management tree (such as shown in FIG. 3 which will be discussed in greater detail below). In a more specific embodiment, Engine 206 supports the classes TopoNode, TopoView, TopoTransaction, TopoViewNode, and TopoType. These classes and subclasses will be discussed in greater detail below.

In one particular embodiment, the subclasses Container and Bus inherit from the TopoNode class. The additional subclasses Array, Monitor, and BusContainer inherit from the Container subclass. TopoNode provides the bulk of the functionality and the attributes to support it. The Container class is used for all the objects that are also views, and supports the classes such as Monitor, Array, and BusContainer that provide specific behavior and attributes for those types of objects. Bus is another instance of the TopoNode class with behavior provided for bus points. This embodiment, folds the functionalities of TopoNode, TopoView, and TopoViewNode into a single C++ class.

In a more particular embodiment, the above-described TopoNode class and Array, Monitor, and BusContainer subclasses map GDMO types as shown in Table 7 and Table 8 below.

TABLE 7

| Behavior Class | GDMO topoType |
|---|---|
| TopoNode | Device, Server, Hub, HLR, SunWs, BTS, Interface, XCDR, Host, BSC, OMC, VLR, Bridge, Printer, Router, Sun, SparcCenter, Java, Sparc2, SparcIX, Ultra, Sparc20, Sparc1, Sparc10, SparcIPX, SparcIPC, Sparc, Ultra1, Sparc5, Ultra2, Link |
| Bus | Bus |
| Container | MSC, Subnetwork, Universe, Network, LinkContainer |
| Array | Array |
| Monitor | Hexagon, OmniSector, Hexagon120, Circle |
| BusContainer | BusContainer |

TABLE 8

| User Type | Derived From | API Class |
|---|---|---|
| A | Sun, Device, Bus, Link | TopoNode |
| B | Container | Container |
| C | Array | Array |
| D | BusContainer | BusContainer |
| E | LinkContainer | Container |

Class decompositions are provided below.

```
Class TopoType {
public:
    // methods for transactions
    static int begin_transaction();
    static void abort_transaction(int xid);
    static void commit_transaction(int xid);
    // method to register for topoType notifications, the
        // TypeChangeFunc takes a reference to TopoType.
        void set_type_change(TypeChangeFunc);
        static TopoType & find_instance(int xid, RWCString
        typename);
        void create_instance(int xid, TopoType&);
        void delete_instance(int xid, RWCString typename);
        RWCString get_name();
        const RWTPtrSlist<TopoType> & get_derived_from() const;
        RWTPtrSlist<TopoType> get_all_derived_from() const;
        RWBoolean is_derived_from (const TopoType &);
        const RWTPtrSlist<TopoType> & get_base_of() const;
        RWTPtrSlist<TopoType> get_all_base_of() const;
        short get_max_visible_level() const;
        short get_max_topology_level() const;
        short get_draw_method() const;
        RWCString & get_default_layer() const;
        const RWTPtrSlist<TopoType>& get_legal_arcs() const;
        RWTPtrSlist<TopoType> get all_legal_arcs() const;
        RWBoolean is_legal_arc (const TopoType &)const;
        const RWTPtrSlist<TopoType>& get_legal_children() const;
        RWTPtrSlist<TopoType> get all_legal_children() const;
        RWBoolean is_legal_child (const TopoType &) const;
        RWDBBlob & get_userdata() const;
        void add_arc (const TopoType &);
        void add_child (const TopoType &);
        void set_draw_method (short method);
        void set_default_layer (RWCString layer);
        void set_userdata (const RWDBBlob & attributes);
Class TopoNode {
public:
    static int begin_transaction();
    static void abort_transaction(int xid);
    static void commit_transaction(int xid);
    // method to register for topoNode notifications
    void set_node_change(NodeChangeFunc);
    void set_view_change(ViewChangeFunc);
    void set_viewnode_change (ViewNodeChangeFunc);
    TopoNode& find_instance(int xid, int id);
    void create_instance(int xid, TopoNode&);
    void delete_instance(int xid, int id);
    // support for actions
    static RWTValSlist<int> get_toponodes_by_name (const
    RWCString&
    name, int match, int depth=0);
    static RWTValSlist<int> get_toponodes_by_type (const
    RWCString&
type);
static RWTValSlist<int> get_toponodes_by_mo (const RWDBBlob&
mo);
static RWTValSlist<int> get_all_nodes();
static RWTValSlist<int> get_all_views();
int get_id() const;
const RWDBBlob & get_mo_set() const;
const RWCString & get_name() const;
const RWCString & get_typename() const;
const RWCString & get_layer() const;
RWDBBlob & get_userdata() const;
const RWTPtrSlist<DisplayStatus> & get_display_status()
const;
const Geolocation & get_geo_location() const;
const RWTPtrSlist<TopoNode> & get_parents() const;
const RWTValSlist<int> & get_parent_ids() const;
const RWTPtrSlist<TopoNode> & get_children() const;
const RWTValSlist<int> & get_children_ids() const;
const RWTPtrSlist<TopoNode> & get_peers() const;
RWTValSlist<int> & get_peer_ids() const;
const RWTPtrSlist<TopoNode> & get_prop_peers() const;
RWTValSlist<int> & get_prop_peer_ids() const;
int get_state() const;
int get_severity() const;
int get_propagated_severity() const;
int get_alarm_count (Severity severity) const;
RWBoolean get_propagation() const;
void set_name (const RWCString & name);
void set_typename (const RWCString & typename);
void set_mo_set (const RWDBBlob &blob);
void set_layer (const RWCString &layer);
void set_geo_location (Geolocation &location);
void set_display_status (const RWTPtrSlist<DisplayStatus>
&list);
void set_state (int state);
void set_severity (int severity);
void set_alarm_count (Severity severity, int value);
void increase_alarm_count (Severity severity);
void decrease_alarm_count (Severity severity);
void set_propagation (RWBoolean propagation);
void add_parent (const TopoNode &);
void remove_parent (const TopoNode &);
void set_parent_ids (const RWTValSlist<int> ids);
void add_peer (const TopoNode &);
void remove_peer (const TopoNode &);
void set_peer_ids (const RWTValSlist<int> ids);
void set_prop_peer_ids (const RWTValSlist<int> ids);};
Class Container: public TopoNode {
        TopoType* type;
public:
        // view node related
        static int get_position (int parentId, int childId) const;
        static set_position (int parentId, int childId, const Point
        &);
        // view specific
        const RWTValSlist<int> get_children() const;
        const RWCString & get_background_image() const;
        const RWCString & get_map_configuration_file() const;
        const RWCString & get_initial_geo_area() const;
        int get_zoom_value() const;
        int get_zoom_focus() const;
        int get_icon_scale() const;
        int get_label_scale() const;
        void set_background_image(RWCString &);
        void set_map configuration_file(RWCString &);
        void set_initial_geo_area(RWCString &);
        void set_zoom_value (int zoom) const;
        void set_zoom_focus (int focus) const;
        void set_icon_scale (int icon_scale) const;
        void set_label_scale (int label_scale) const;};
Class Monitor: public Container {
    int rotation;
    RWTPtrSlist<TopoNode> visible_children;
public:
    const RWTPtrSlist<TopoNode> & get_visible_children() const;
    void set_visible_children(RWTValSlist<int> & list) const;};
Class Array: public Container {
    int array_orienation;
    int array_num_columns;
    ArrayCellSize array_cell_size;
public:
    int get_array_orientation() const;
    int get_array_num_columns() const;
    ArrayCellSize get_array_cell_size() const;
    void set_array_orientation (int orientation) const;
    void set_array_num_columns (int orientation) const;
    void set_array_cell_size (const ArrayCellSize
    array_cell_size) const;};
Class Bus: public TopoNode {
        RWTPtrSlist(Point) bus_points;
public:
        RWTPtrSlist(Point) get_bus_points() const;
        void set_bus_points(RWTPtrSlist(Point)& bus_points) const;};
Class BusContainer: public Container {
        RWTPtrSlist(Point) bus_points;
public:
        RWTPtrSlist(Point) get_bus_points() const;
        set_bus_points(RWTPtrSlist(Point)& bus_points)const;};
Class Point {
        int x, y, z;
public:
        Point(int _x = 0, int _y = 0, int _z = 0);
        Point(const Point& p): x(p.x), y(p.y), z(p.z);
```

-continued

```
        void set (int _x, int _y, int _z);
        Point& operator = (const Point& p);
        RWBoolean operator == (const Point& other) const;};
Class ArrayCellSize {
public:
        TopologyArrayCellSize();
        int width;
        int height;};
```

Persistence Layer 208 provides support for the operation of Database 114. In one embodiment, Persistence Layer 208 consists only of a TopoPersist class that is configured to provide a persistence service for the topology objects in a Engine 206, including support for the creation, deletion and modification of the persistent attributes of the topology objects. In a more specific embodiment, the service is provided within the context of transactional semantics. This provides the ability to make atomic, consistent changes to several attributes of one or more topology objects. In another embodiment, the TopoPersist class uses a commercial relational database management system ("RDBMS") to provide the persistent storage using a database schema. One example of the TopoPersist class is shown below as a decomposition in Table 9. Other implementations can be determined by those of skill in the computer science and network arts.

TABLE 9

```
TopoPersist()
TopoPersist(persist_server, repository_name)
begin_transaction()-returns a transaction_id
commit_transcation(transaction_id)
rollback_transaction(transaction_id)
modify_node(transaction_id, topo_node,
attribute_map)
read_node(transaction_id, topo_node, attribute_map)
create_node(transaction_id, topo_node,
attribute_map)
delete_node(transaction_id, topo_node)
read_type(transaction_id, topo_type, attribute_map)
create_type(transaction_id, topo_type, attribute_map)
delete_type(transaction_id, topo_type)
```

Figure 3A:
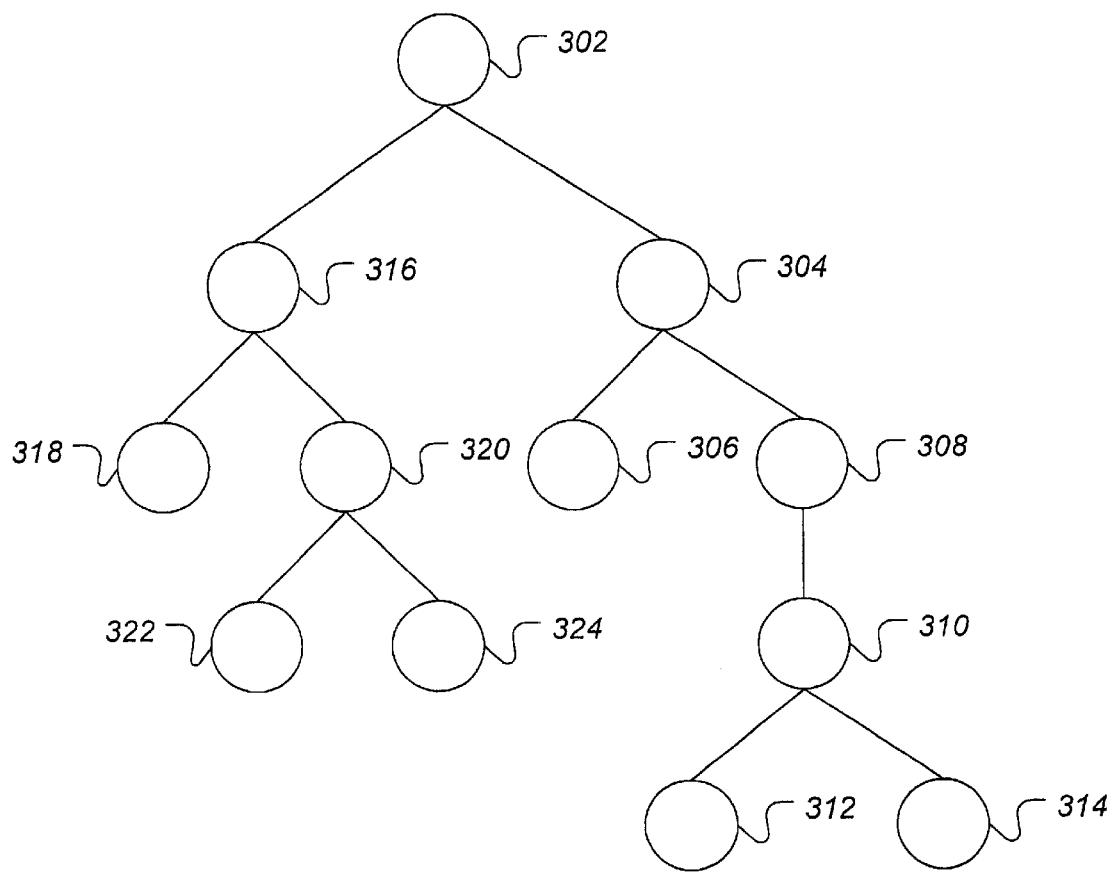
FIG. 3A is an illustration of a object hierarchy.

The operation of the Topology Service of the invention will be described with respect to an object or node hierarchy illustrated in FIGS. 3A and 3B. FIG. 3A illustrates a "management information tree" comprising a root node 302 from which extends nodes 304–324 that are organized into sub-hierarchies. Using the methods, systems, and software provided by the present invention, information on any of the nodes in the tree can be obtained for various uses, such as display on UI 102 as illustrated in FIG. 3B in which a representation of node 314 shown at 314'.

Figure 3B:
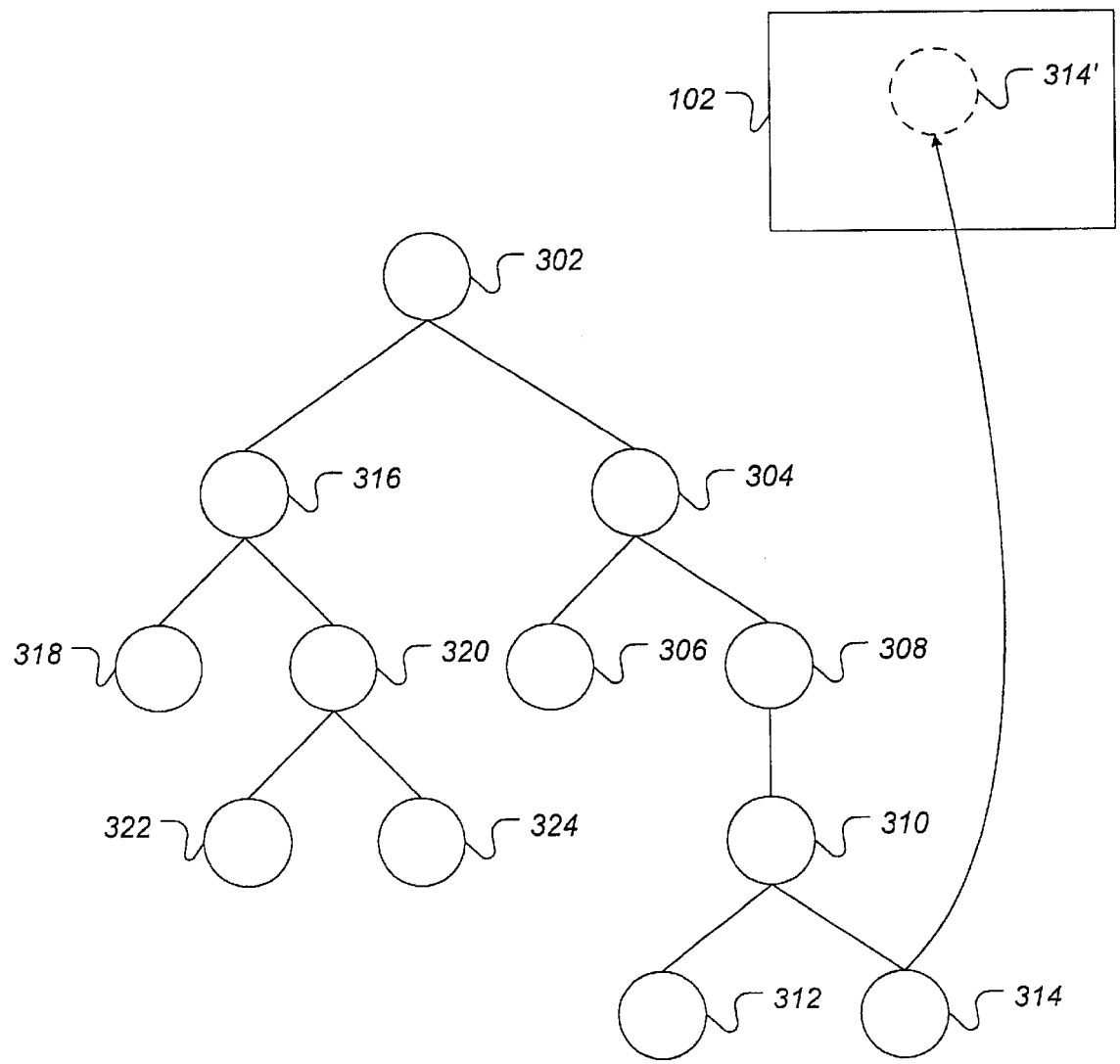
FIG. 3B is an illustration of the relationship between a node on the object hierarchy of FIG. 3A and UI 102 of FIG. 1.
Figures 4, 5:
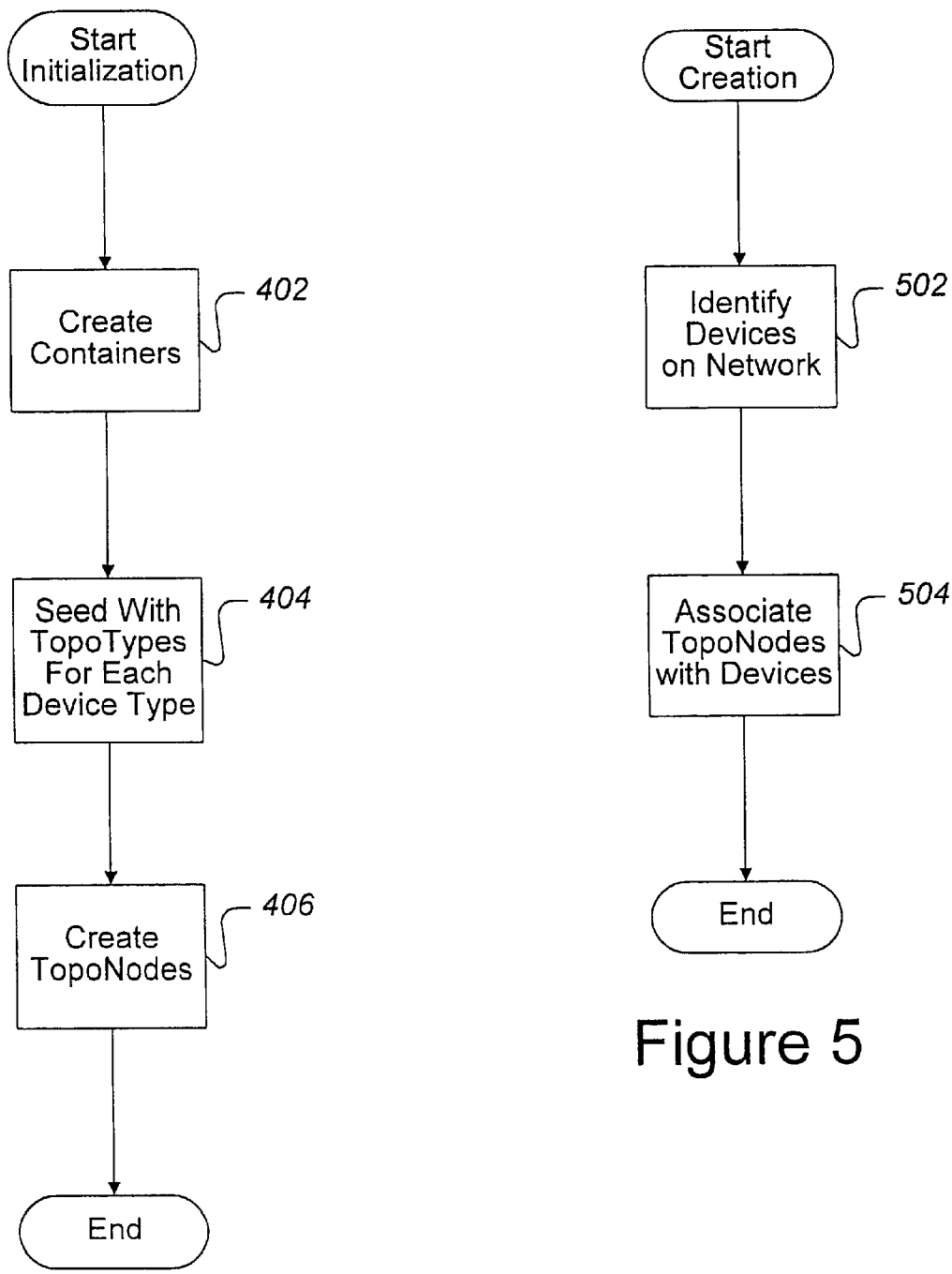
FIG. 4 is a flowchart of one embodiment of an initialization process in accordance with one embodiment of with the present invention.
FIG. 5 is a flowchart of a node creation process in accordance with one embodiment of the present invention.

FIGS. 4–12 illustrate the operation of one embodiment of Topology Service 112. FIG. 4 illustrates an embodiment of a process by which Topology Service 112 initializes various "topology nodes" that represent various entities on the network, such as illustrated in FIG. 3A. At step 402 container objects are created to contain the instances of the above-described topology objects. Examples of such objects include the above-described TopoNode objects, TopoType objects, and TopoView objects. Other examples will be familiar to those of skill in the art. At step 404 the Topology Service is seeded with TopoType objects for each device type. In one embodiment, these objects include pre-defined device types as well as user-defined device types. In another embodiment, the objects are kept in memory and stored persistently. At step 406 the Root Node, e.g., node 302 in FIGS. 3A and 3B, is created.

FIG. 5 illustrates an embodiment of the creation of the remaining topology nodes (e.g., nodes 304–324 in FIGS. 3A and 3B). Starting at step 502 each device and/or entity installed on the network is identified. According to one embodiment, such identification can be done using an application, such as represented at 102 in FIG. 1, or by pre-definition. An example of an application for discovering devices and/or entities is provided in co-pending U.S. patent application Ser. No. 09/206,097, filed on even date herewith and which is incorporated herein by reference in its entirety and for all purposes. Alternatively, the Topology Service can include a facility to perform device/entity discovery. At step 504, TopoNode objects are associated with the discovered devices (including agents associated with the devices) and/or entities. In one embodiment, "zero-caching" of the created objects is employed. In this embodiment, only those objects being used by the Topology Service are put into memory; and these objects are destroyed when no longer needed by the Topology Service. In another embodiment, objects holding views and leaf nodes are held in memory.

Figure 6:
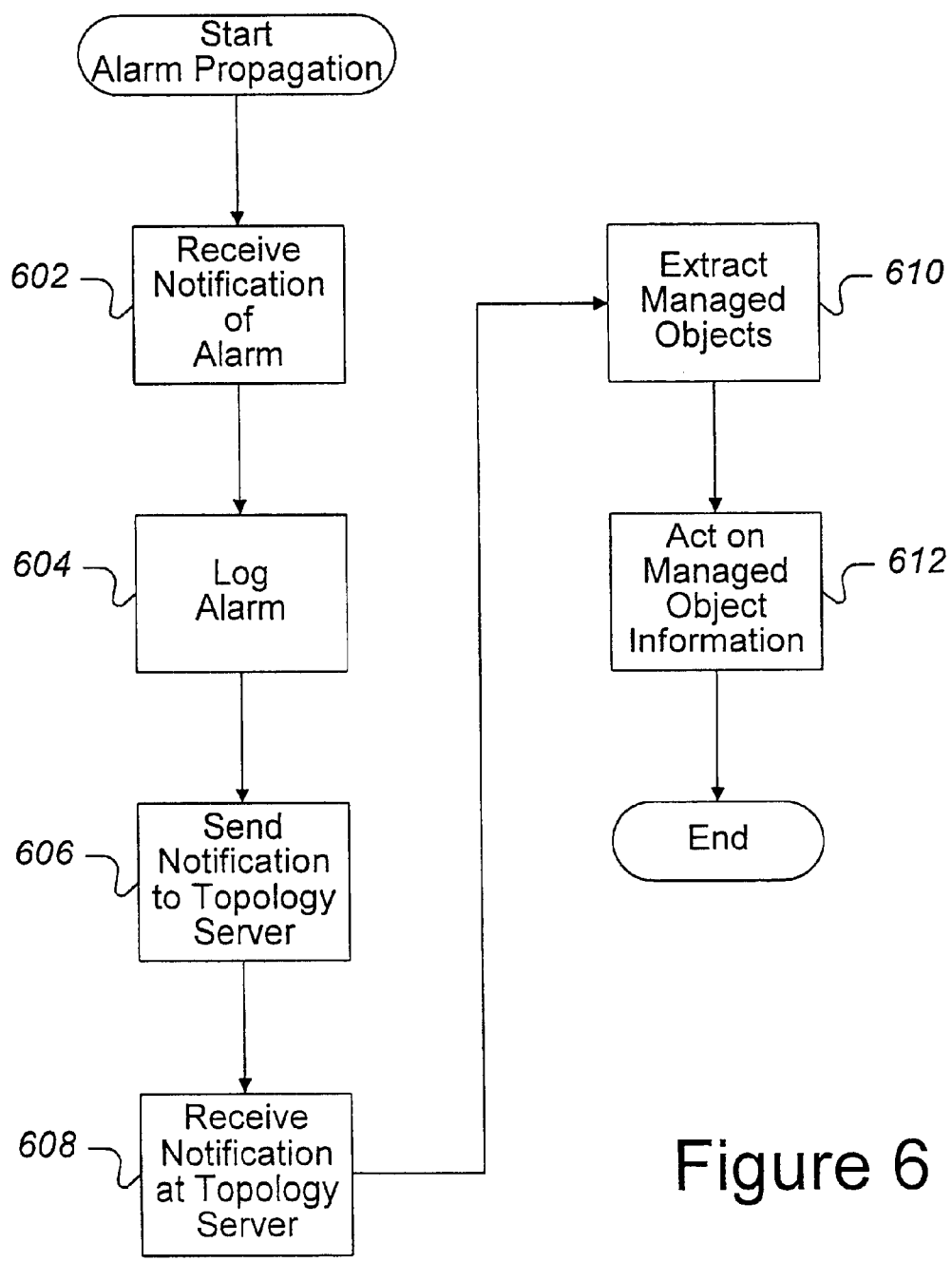
FIG. 6 is a flowchart of an alarm propagation process in accordance with one embodiment of the present invention.
Figure 7:
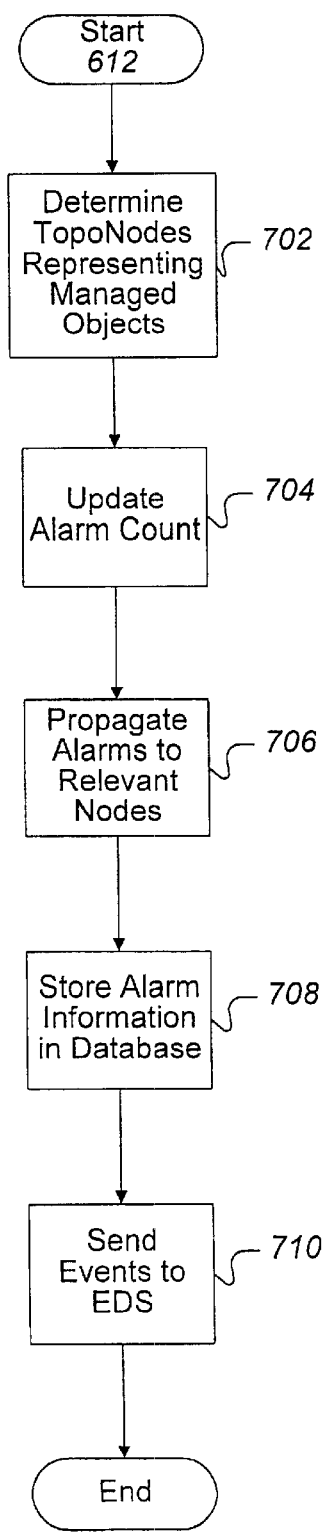
FIG. 7 is a flowchart illustrating step 612 of FIG. 6 in greater detail.

FIGS. 6 and 7 illustrate an embodiment of the invention in which Topology Service 112 processes and propagates alarms received from agents, entities, and devices on the network. Starting at step 602 alarms sent by a device or entity are received by Log/Alarm Service 118 via EDS 116. The alarm is logged at step 604 by Log/Alarm Service 118, which sends a notification of the alarm to Topology Service 112 via EDS 116 at step 606. At step 608, the Topology Service receives the notification and extracts the managed objects at step 610. The Topology Service then acts on the managed objects at step 612.

Figure 8:
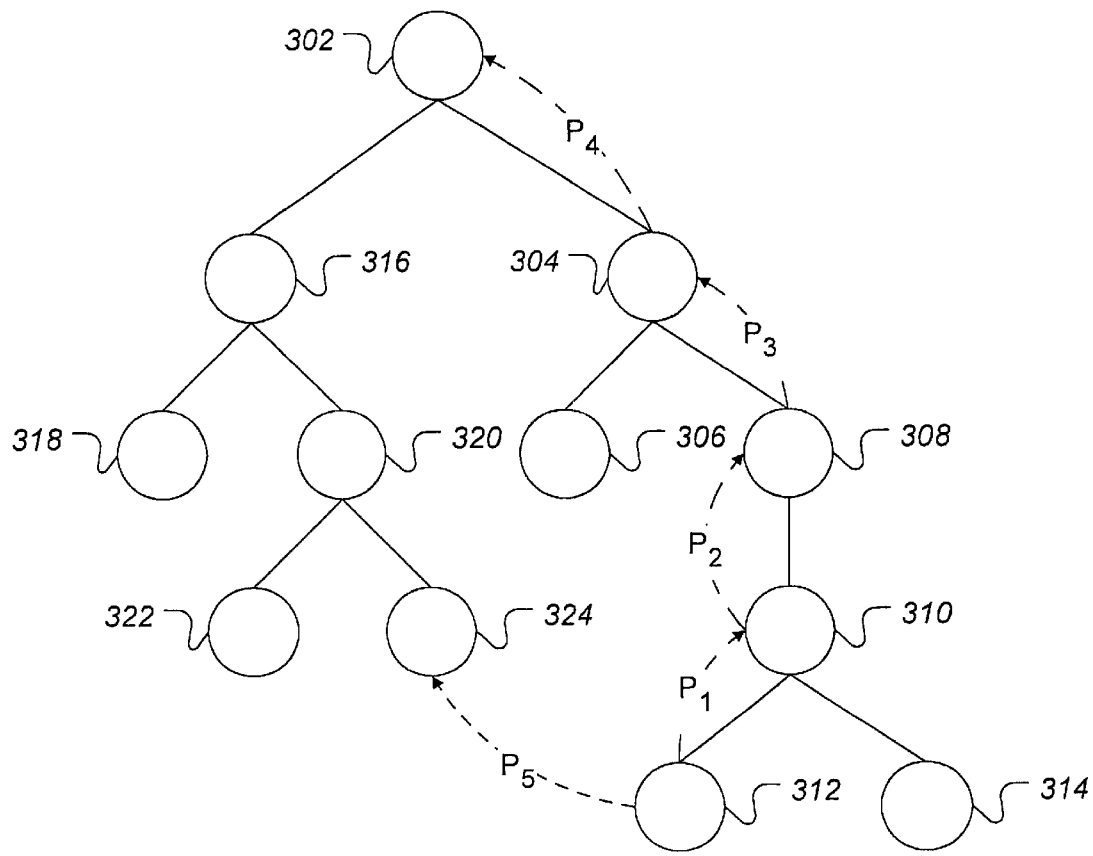
FIG. 8 is an illustration of the propagation of information among related topology nodes in accordance with one embodiment of the present invention.

The action taken on the managed objects by Topology Service 112 is described in greater detail in FIG. 7. Starting at 702, the Topology Service determines which TopoNodes represent the managed objects. At step 704 the alarm count for those TopoNodes is updated and the alarms are propagated to the relevant nodes. In one embodiment, propagation is performed for all nodes that have a "parent" relationship to the TopoNode of the managed object reporting the alarm in addition to any nodes defined to receive such updates. One example of such propagation is provided in FIG. 8. There, node 312 reports an alarm. After updating the TopoNode for the alarm state, the alarm is propagated to TopoNodes 310, 308, 304, and 302 as illustrated by arrows $P_1$–$P_4$. In addition, the alarm is also propagated to TopoNode 324 as shown by arrow $P_5$. Although TopoNode 324 is not a parent, in the example illustrated by FIG. 8 is has been designated to receive such notifications. Returning to FIG. 7, at step 708 the alarm information is written to a database that holds the TopoNodes updated in step 708. The notifications of the updates of the TopoNodes are sent as events to EDS 116 which processes the events.

Figure 9:
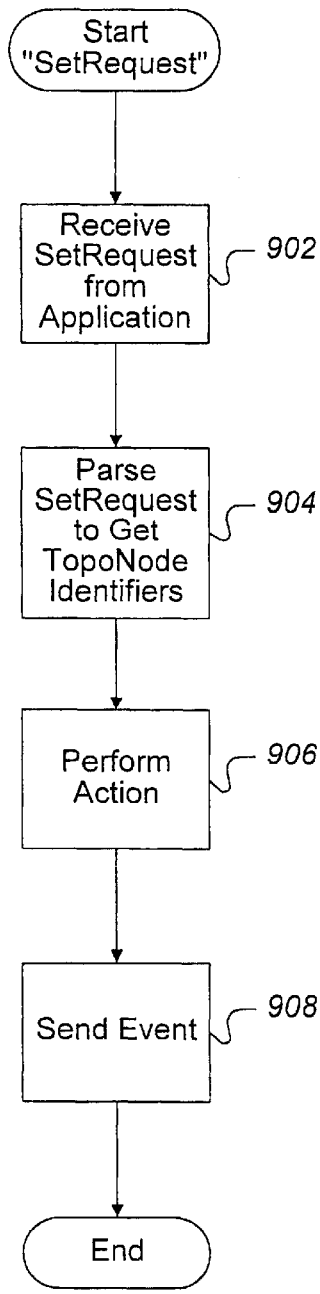
FIG. 9 is a flowchart of an "SetRequest" process in accordance with one embodiment of the present invention.

FIGS. 9–12 illustrate embodiments of the maintenance of the TopoNodes. FIG. 9 illustrates one embodiment of a process to change one or more parameters of one or more TopoNode objects using a "Set Request" CMIP command. At step 902 the Topology Service receives a SetRequest command from an application (e.g., UI 102), agent, entity, or the like. The command is parsed to determine the TopoNode identifiers at step 904. At step 906 the identified TopoNodes are acted upon in accordance with the instructions provided in the command received at step 902. At step 908 one or more events are sent to notify relevant entities of the changes made to the identified TopoNodes.

Figure 10:
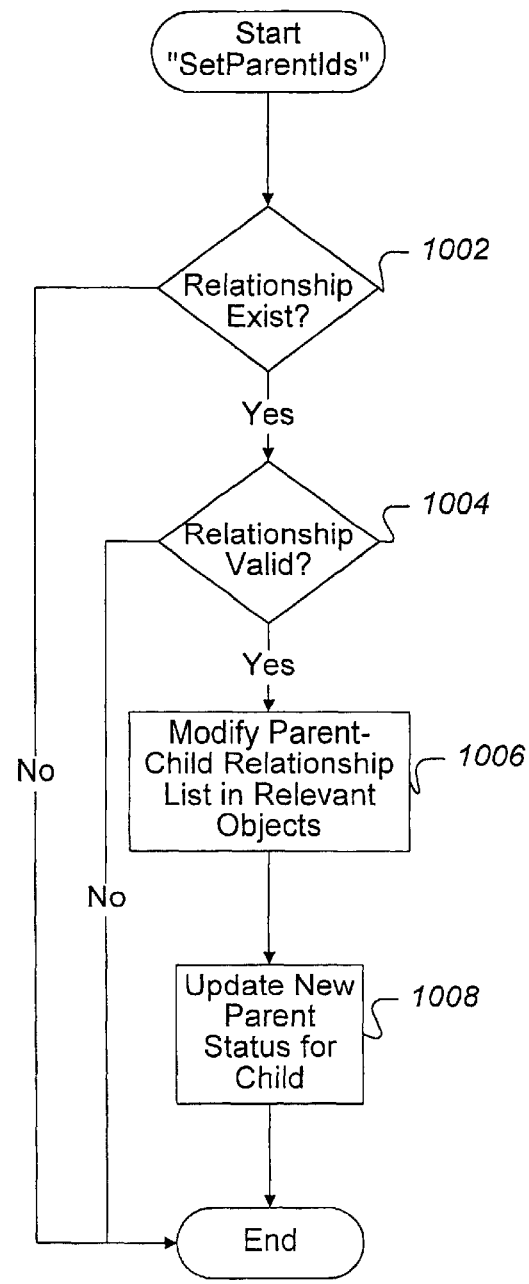
FIG. 10 is a flowchart of an "SetParentIDs" process in accordance with one embodiment of the present invention.

FIG. 10 illustrates an embodiment of the present invention for performing a "SetParentIDs" command. Starting at 1002 a determination is made as to whether a parent-child relationship identified in the command exists. If the relationship does not exist, then processing is terminated as indicated by the "no" branch of step 1002. If the relationship does exist, the "yes" branch of step 1002 is followed to step 1004 where a determination is made whether the relationship is valid. If the relationship is not valid, then processing is terminated as indicated by the "no" branch of step 1004. Otherwise, the "yes" branch of step 1004 is followed to step 1006 where the parent-child relationship list of the relevant TopoNode objects is modified in accordance with the SetParentID command. The new parent status is then updated for the child at step 1008.

Figures 11, 12:
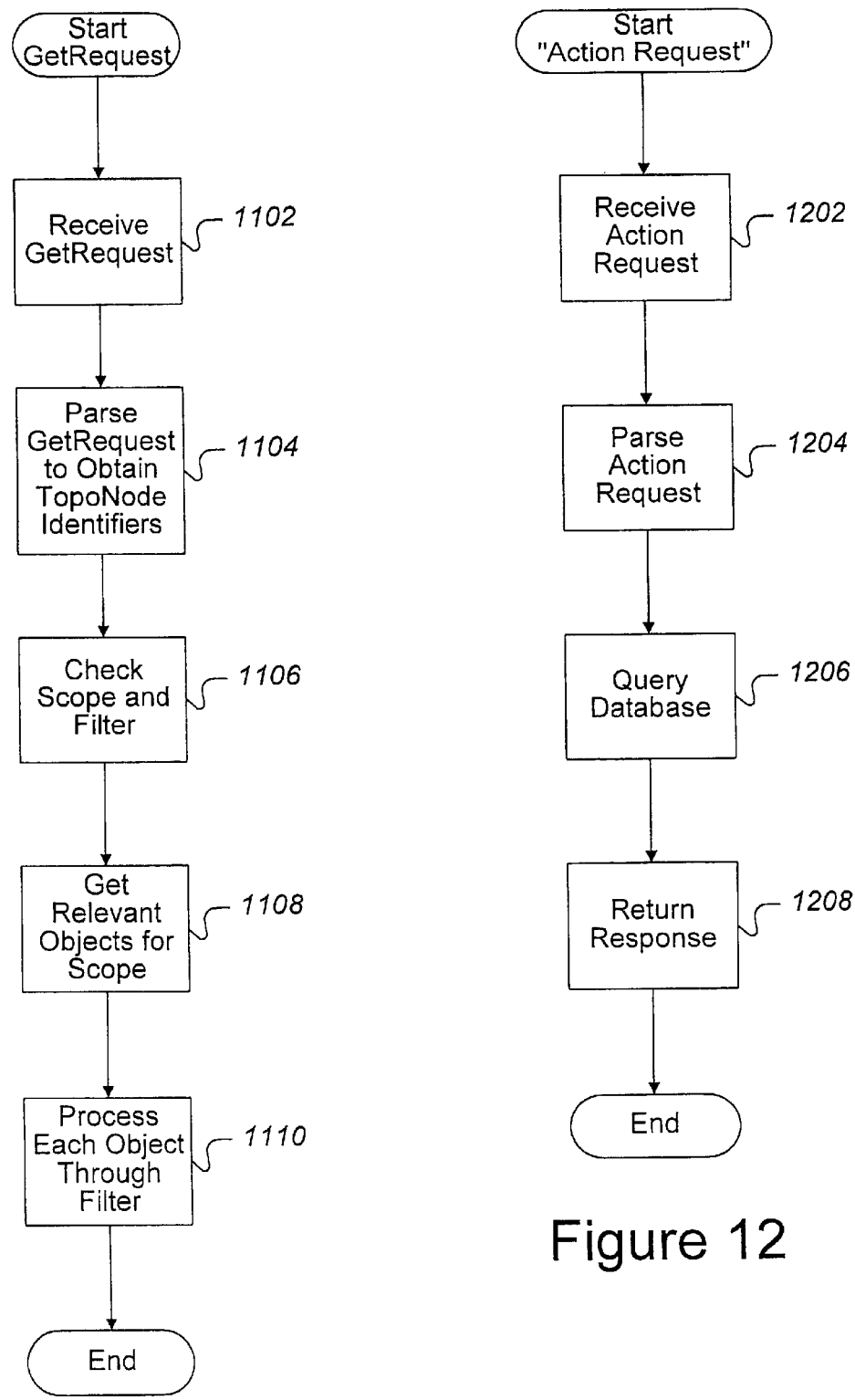
FIG. 11 is a flowchart of an "GetRequest" process in accordance with one embodiment of the present invention.
FIG. 12 is a flowchart of an "ActionRequest" process in accordance with one embodiment of the present invention.

FIG. 11 illustrates one embodiment of the present invention for a process for performing a "GetRequest" on TopoNodes managed by the Topology Service of the invention. Starting at 1102, the Topology Service receives a GetRequest and parses the request at step 1104 to obtain TopoNode identifiers and scope and filter information. At step 1106, the Topology Service checks the scope and filter information provided by the request. At step 1108, the relevant TopoNodes are retrieved, and, at step 1110, the objects are filtered and processed according to the request.

FIG. 12 illustrates one embodiment of the present invention for performing an "ActionRequest" on TopoNodes managed by the Topology Service of the invention to perform a database inquiry. The Topology Service receives the request at step 1202. The action is parsed at step 1204 to obtain the necessary database query parameters. The query is performed at step 1206 and the results are returned at step 1208.

The present invention employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms such as identifying, running, or comparing. In any of the operations described herein that form part of the present invention these operations are machine operations. Useful machines for performing the operations of the present invention include general-purpose digital computers or other similar devices. In all cases, there should be borne in mind the distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general-purpose computer selectively activated or reconfigured by a computer program stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps. The required structure for a variety of these machines will appear from the description given below.

In addition, the present invention further relates to computer readable media that include program instructions for performing various computer-implemented operations. The media and program instructions may be those specially designed and constructed for the purposes of the present invention, or they may be of the kind well known and available to those having skill in the computer software arts. Examples of computer readable media include, but are not limited to, magnetic media such as hard disks, floppy disks, and magnetic tape; optical media such as CD-ROM disks; magneto-optical media such as floptical disks; holographic storage arrays, and hardware devices that are specially configured to store and perform program instructions, such as read-only memory devices (ROM) and random access memory (RAM). Examples of program instructions include both machine code, such as produced by a compiler, and files containing higher level code that can be executed by the computer using an interpreter.

Figure 13:
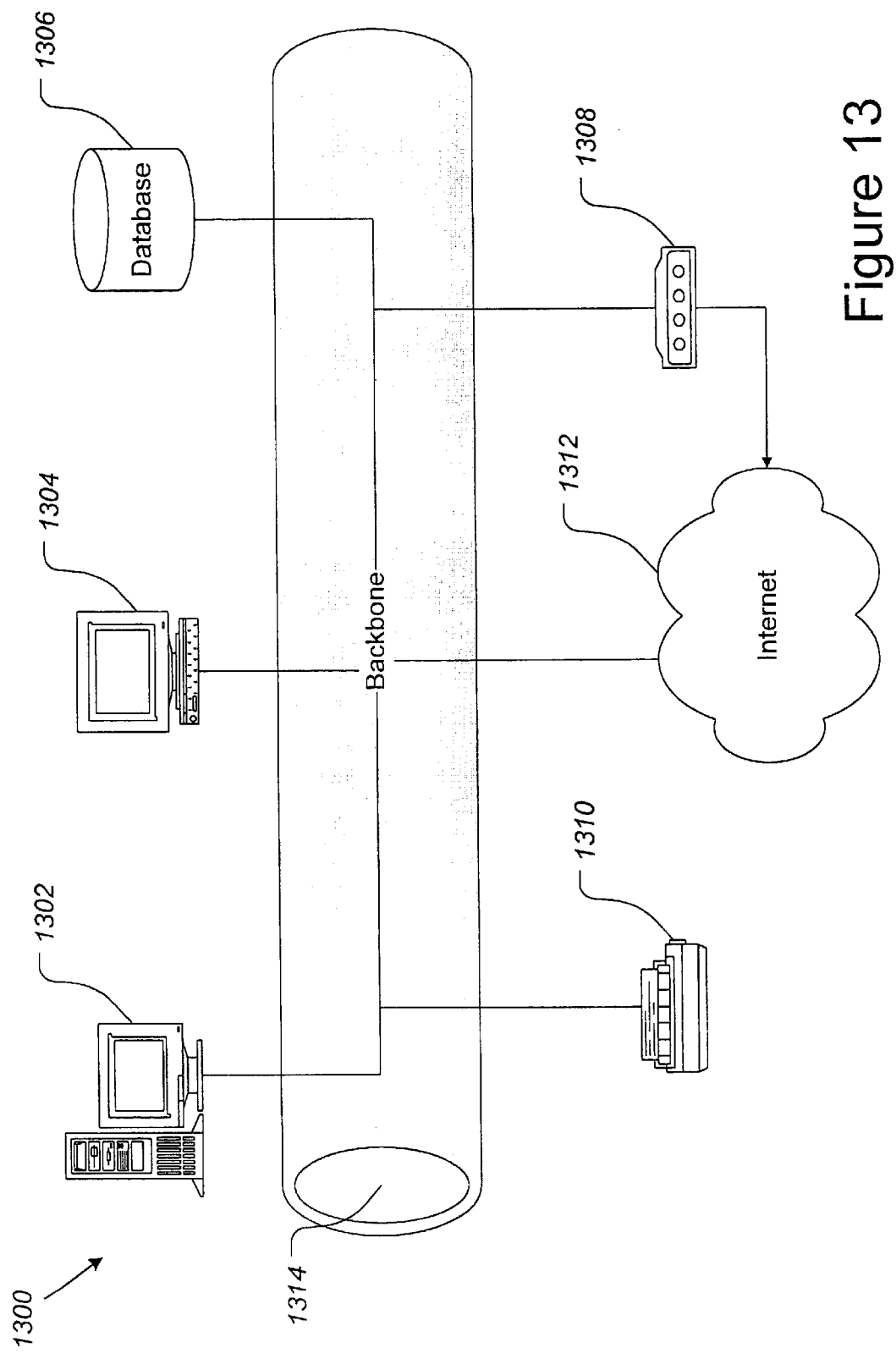
FIG. 13 is a schematic illustration of a computer network.

The present invention further relates to computer networks such as illustrated at 1300 in FIG. 13. There, a server 1302 (which can be a plurality of servers depending on the network configuration) provides network data and management resources for operating network 1300. In one embodiment, the network management software provided by the present invention, in particular, the above-described Name Service is installed and operated from server 1302. Various devices and entities reside on and communicate over the network. These devices and entities include, but are not limited to, client computers 1304, data storage devices 1306, modems and other communications devices 1308, printers other hardcopy input/output devices 1310, and connections to the Internet (which is shown generally at 1312). All of these devices communicate with each other over network backbone 1314. Still other common network devices not shown include hub, routers, packet switchers, switches, hosts, bridges and the like. As noted above, each of these devices can include one or more drivers, agents, and/or proxies that are managed by network management computers such as illustrated at 1302.

Figure 14:
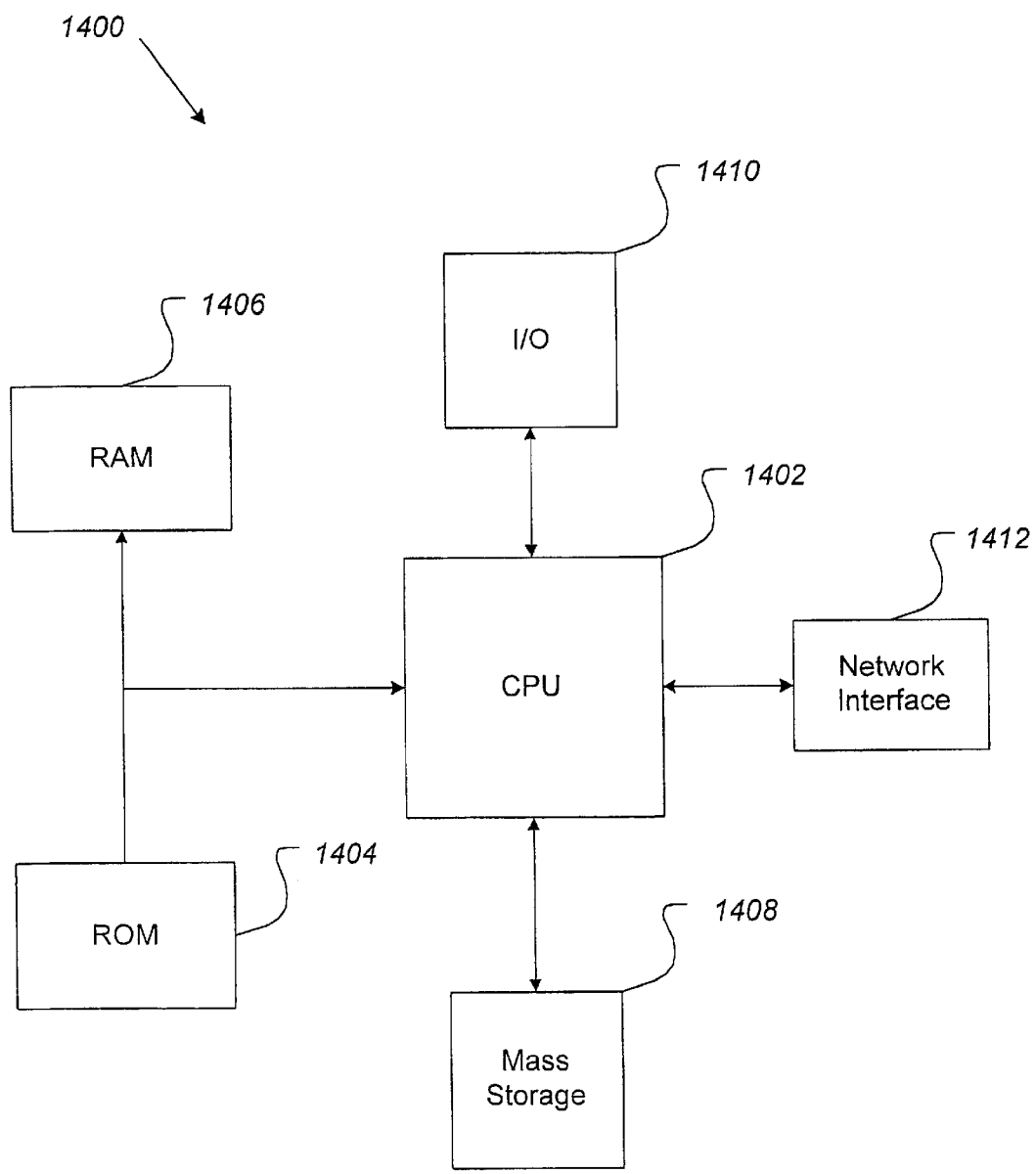
FIG. 14 is a schematic illustration of a computer system.

FIG. 14 at 1400 shows a typical computer-based system in accordance with the present invention. Shown is a central processing unit 1402 (CPU) which is coupled to memory devices including read only memory 1404 (ROM) and random access memory 1406 (RAM). As is well known in the art, ROM 1404 acts to transfer data and instructions unidirectionally to the CPU and RAM 1406 is used typically to transfer data and instructions in a bidirectional manner. A mass memory device 1408 is also coupled bidirectionally to CPU 1402 and provides additional data storage capacity. The mass memory device 1408 may be used to store programs, data and the like and may take the form of a magnetic or paper tape reader or some other well known device (e.g., CD-ROM). It will be appreciated that the information retained within the mass memory device 1408, may, in appropriate cases, be incorporated in standard fashion as part of RAM 1406 in the form of virtual memory. CPU 1402 is also coupled to one or more input/output devices 1410 (I/O) which include, but are not limited to, devices such as video monitors, trackballs, mice, keyboards, microphones, touch-sensitive displays, transducer card readers, magnetic or paper tape readers, tablets, styluses, voice or handwriting recognizers, or other well-known input devices such as, of course, other computers. Finally, CPU 1402 optionally can be coupled to a computer or telecommunications network 1414 using a network connection as shown generally at 1412. The above-described devices and materials will be familiar to those of skill in the computer hardware and software arts (see, e.g., Ralston, Anthony, and Reilly, Edwin D. 1993. *Encyclopedia of Computer Science*. Van Norstrand Reinhold; Herzog, James H. 1996. *Design and Organization of Computing Structures*. Franklin, Beedle & Associates, Inc.; Stone, Harold S. 1983. *Microcomputer Interfacing*. Addison Wesley; Martin, James, and Chapman, Kathleen K. 1989. Local Area *Networks: Architectures and Implementations*. Prentice Hall.)

CONCLUSION

Thus, the present invention will be seen to provide an efficient, scalable, and modular software, systems, and methods for providing topology services for managing information about devices and other entities on a computer and communications networks. Using the software, systems, and methods described herein name services large, complex networks can be implemented efficiently.

Although certain embodiments and examples have been used to describe the present invention, it will be apparent to those having skill in the art that various changes can be made to those embodiment and/or examples without departing from the scope or spirit of the present invention. For example, it will be appreciated from the foregoing that many steps of processing can be implemented in a sequence different from that described herein without altering the invention. In addition, various naming conventions can be used in conjunction with the naming service without significant change to the systems, software, or methods described herein.

What is claimed:

1. A system for representing devices on a computer network, comprising:
   a) a topology service including:
      i) a protocol interface mechanism;
      ii) an engine; and
      iii) a database support mechanism; said protocol mechanism, said engine, and said database support mechanism being configured to operate as independent components such that any of said protocol interface mechanism, said engine, and said database support mechanism components can be substituted with a second such component without substantial reconfiguration of the remaining components; said topology service being coupled with
   b) a data storage mechanism.

2. The system of claim 1, wherein said database support mechanism is configured to provide relational database functions to manage a database.

3. The system of claim 1, wherein said engine comprises a series of object classes configured to define computer network topology nodes that include information about devices on said computer network.

4. The system of claim 1, wherein said protocol interface is configured to receive messages from other services and entities on said computer network and translate said messages into a format compatible with said engine.

5. A system for representing devices on a computer network, comprising:
   a topology service including:
      i) a protocol interface mechanism;
      ii) an engine; and
      iii) a database support mechanism; said topology service being coupled with a data storage mechanism; and wherein
   said protocol mechanism, said engine, and said database support mechanism are configured to operate as independent components such that any of said protocol interface mechanism, said engine, and said database support mechanism components can be substituted with a second such component without substantial reconfiguration of the remaining components.

6. The system of claim 5, wherein said engine comprises a series of object classes configured to define computer network topology nodes that include information about devices on said computer network.

7. The system of claim 5, wherein said protocol interface is configured to receive messages from other services and entities on said computer network and translate said messages into a format compatible with said engine.

8. The system of claim 5, wherein said database support mechanism is configured to provide relational database functions to manage a database.

* * * * *